INVENTOR.
HORACE M. ROBINSON
BY
Flam and Flam
ATTORNEYS.

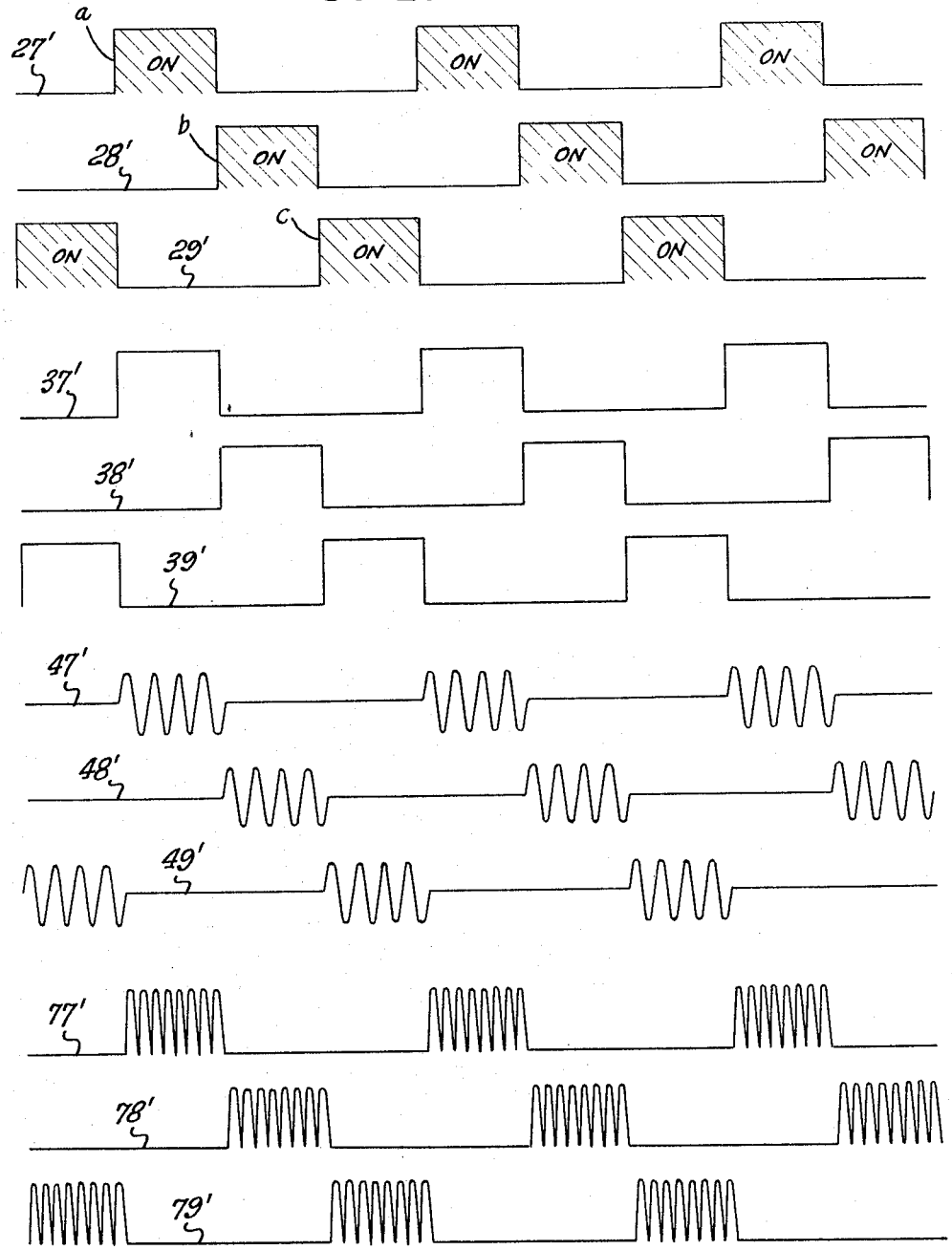

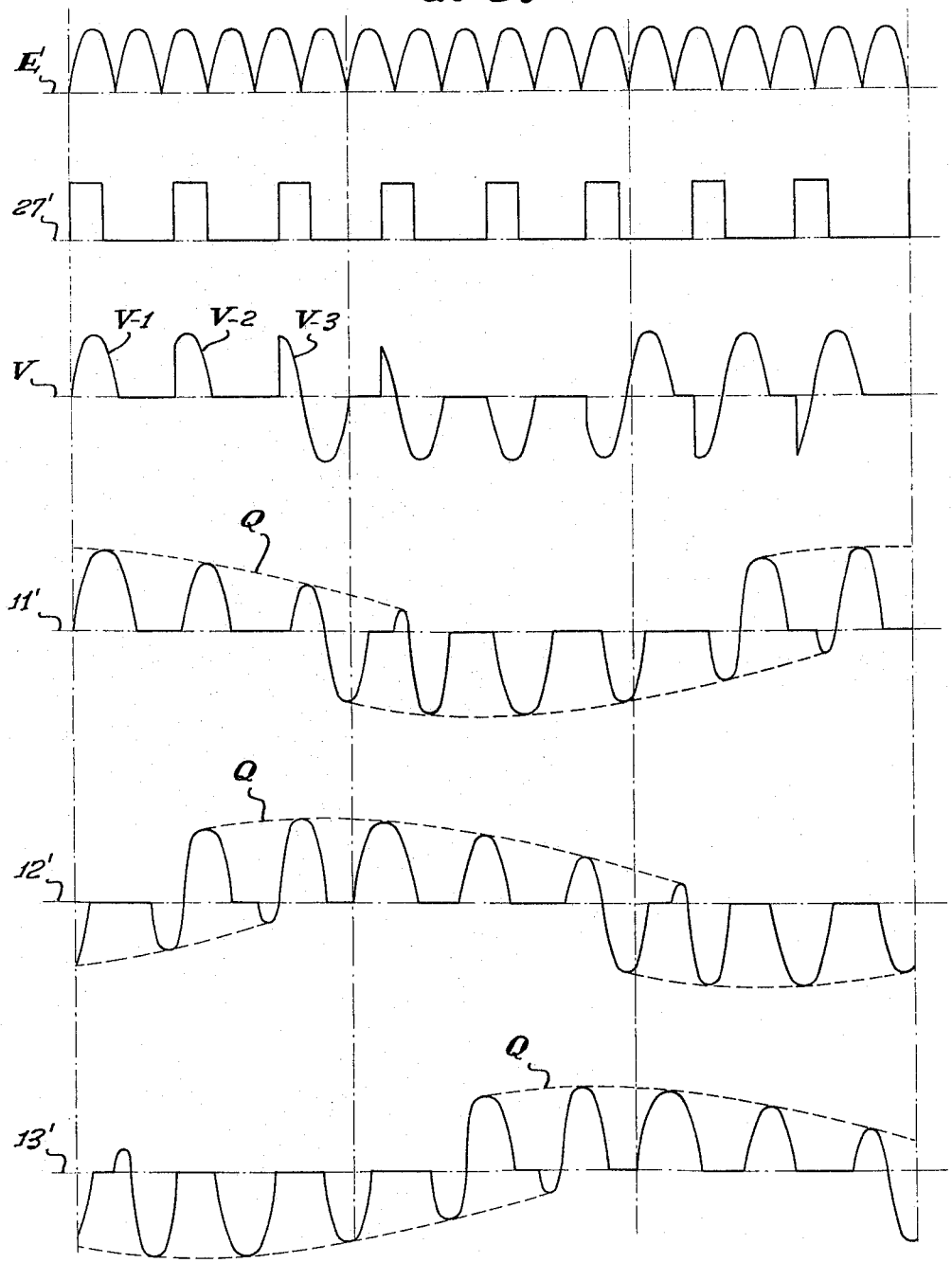

United States Patent Office 3,287,617
Patented Nov. 22, 1966

3,287,617
VARIABLE FREQUENCY POWER SUPPLY FOR DYNAMOELECTRIC MACHINES
Horace M. Robinson, Los Angeles, Calif., assignor to Space Ships, Incorporated, Los Angeles, Calif., a corporation of Nevada
Continuation of abandoned application Ser. No. 117,880, June 19, 1961. This application Oct. 2, 1964, Ser. No. 403,438
17 Claims. (Cl. 318—138)

This application is a continuation of my copending application for United States Letters Patent Serial No. 117,880, filed June 19, 1961 and now abandoned.

This invention relates to dynamoelectric machines and more particularly to a unique variable frequency power supply for such machines adapted to drive the same with high torque over wide-range synchronous and nonsynchronous speeds in either direction including zero speed.

The dynamoelectric machine of this invention typically utilizes a pair of relatively movable members one of which is provided with suitably spaced windings adapted to be excited or energized in sequential order by a common electric power source. This power source may be either direct or single phase alternating current, the elected power source being appropriately modulated, as will be explained hereinafter by way of example, to excite the winding sections at any desired frequency to provide a corresponding precise relative speed between said pair of members.

Difficulties have been encountered in designing control circuits capable of providing several outputs of a common source modulated in out-of-phase relationship due to factors such as reactive feedback and other factors of interaction of circuit elements. The problem is especially pressing with large power outputs. Accordingly, a primary object of this invention is to provide a variable frequency power supply for use in exciting a reversible variable speed dynamoelectric machine such as is described in the aforementioned copending application.

Another object of this invention is to provide an improved method of achieving a speed control for such a machine. In this connection, I have found that as the frequency of modulation increases from half the line frequency to a frequency above the line frequency the speed of the machine slows to zero and reverses. A further increase in modulation frequency above line frequency results in a reversal of torque and in increase in speed. I have further found that the pull-out torque for zero speed at modulation frequency equal to line frequency is a finite value, whereas pull-out torque at zero speed corresponding to zero modulation frequency is minimal. An increased measure of stability is achieved by utilizing operating characteristics over an extended range from at least half line frequency to one and one-half times line frequency and above, and relying upon modulation frequency equal to line frequency for zero speed.

Another object of this invention is to provide simplified circuitry for achieving the desired results.

Other objects of this invention will be set out in the appended claims or hereinafter made apparent in a description of a preferred exemplary physical embodiment of the invention as illustrated in the accompanying drawings.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense since the scope of this invention is best defined by the appended claims.

Referring to the drawings:

FIGURE 2 is a composite diagram illustrating the wave form at several places in the circuit of FIGURE 1; and FIGURE 3 is a diagram illustrating the current wave form in the several motor winding sections.

Figure 1:
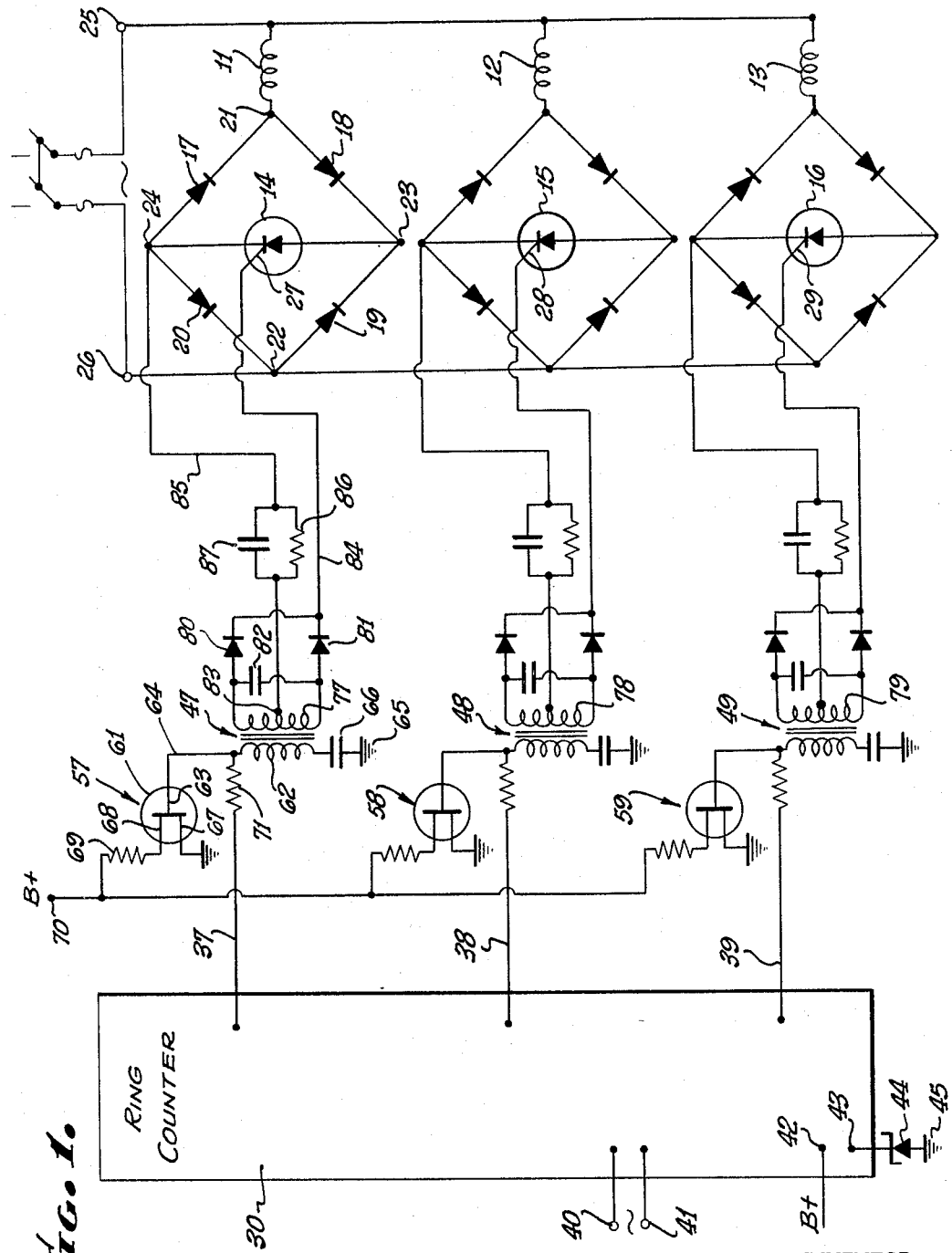
FIGURE 1 is a wiring diagram illustrating a control circuit for use in the present invention.

In FIGURE 1 three stator winding sections 11, 12 and 13 are illustrated that are arranged generally as phases of a multiphase device. In the present example, there are three winding sections. However, any number may be provided as desired. A two-pole rotor structure (not shown), such as described in copending application Serial No. 50,892 (filed August 22, 1960, entitled, Variable Speed Motor, and assigned to the same assignee as this application), cooperates with the stator structure.

Serially associated with each winding section 11, 12 and 13 is a silicon controlled rectifier (SCR) 14, 15 and 16, or other suitable switching or modulating device. Since the SCR's 14, 15 and 16, chosen by way of example for application here, are unidirectionally conductive devices, a network must be provided to couple the devices to the alternating current circuit. For this purpose full-wave rectifying bridges are provided for each SCR 14, 15 and 16.

Thus, for example, for the SCR 14 there are four diodes 17, 18, 19 and 20 arrayed between load terminals 21 and 22 and quadrature terminals 23 and 24, each diode extending between one load terminal and one quadrature terminal to constitute the familiar quadrilateral diode bridge. The SCR 14 connects across the quadrature terminals 23 and 24.

A single phase alternating current power source applied to power terminals 25 and 26 drives the winding sections through their associated switches 14, 15, 16. The polarities of the diodes being appropriately arranged relative to the SCR's, A.C. conduction results. Thus, for example, when the power terminal 25 is more positive than the power terminal 26, current flows from the power terminal 25 to the winding section 11, diode 18, quadrature terminal 23, SCR 14, quadrature terminal 24, diode 20, load terminal 22 and power terminal 26. Similarly, if the power terminal 26 is more positive than the power terminal 25, current flows from the power terminal 26, load terminal 22, diode 19, quadrature terminal 23, SCR 14, quadrature terminal 24, diode 17, load terminal 21, winding section 11, to power terminal 25. Obviously the same effect is prdouced when pulsating D.C. source or continuous D.C. source is applied to terminals 25, 26.

Each of the SCR's 14, 15 and 16 has a gate connection 27, 28 and 29, whereby excitation of the winding sections 11, 12 and 13 is sequenced by turning the SCR's on and off. SCR's 14, 15 and 16 are made conductive or switched to their "on" states by application of current between the gate 27 and the cathode in excess of the critical value $I_{GT}$. The cathodes are common to one of the quadrature terminals, as at 24.

A quite usable wave form (to be described hereinafter) is produced in winding sections 11, 12 and 13 by applying voltages or currents to the gates 27, 28 and 29 in time-spaced sequence such as illustrated in FIGURE 2. Thus, in FIGURE 2, and at the diagram 27, 28 and 29, are illustrated patterns of gate voltages or current to the respective gates 27, 28 and 29. Gate current adequate to turn the corresponding switching devices on exists for one-third of a cycle or 120 degrees, a switching current or voltage being applied to one gate just as it is removed from the previous one. The SCR's, however, respond essentially to the initial leading edges *a*, *b* and *c* because the SCR's 14, 15 and 16 turn off only when anode voltage drops to a value near zero, and in a manner to be explained more fully hereinafter.

In order to produce the pulses in a desired sequential and phase relationship corresponding to those illustrated at 27', 28' and 29' in FIGURE 2, a ring counter circuit generally indicated by the block diagram 30 is provided (FIGURE 1). This ring counter may be of the type described, for example at page 67 of a technical bulletin published by General Electric entitled, "Notes on the Application of the Silicon Unijunction Transistor," ECG–380, dated February 1959.

The ring counter 30 has, in this instance, three output leads 37, 38 and 39 corresponding in number to the three winding sections 11, 12 and 13. The output voltage at 37, for example, corresponds in shape to that at the gate 27 and as shown, for example, in the curve 37' in FIGURE 2. The frequency of output voltage is controlled by a signal applied at control terminals 40 and 41 by a suitable source, such as pulses produced by a transducer under the control of signals stored on a tape controlling the transducer. For example, magnetically stored signals of any desired frequency and transduced at a constant linear speed can be used to provide a variable frequency control signal for a signal generator. Equidistantly spaced signals passed by the transducer or other equivalent means can also be used.

The ring counter is driven from a power source indicated by a B+ terminal 42. A common connection 43 serves as a "ground" for the ring counter. However, the common connection 43 is actually above ground. This is provided by a Zener diode 44 interposed between the terminal 43 and ground 45. The voltage at the output lead 37 thus swings between "ground" potential of the ring counter, namely, the potential of the diode 44 (say, ten volts) (37' of FIGURE 2), and an elevated potential (say, 13 volts).

The output leads 37, 38 and 39 are not directly connected to the gates of the corresponding SCR's 14, 15 and 16, because factors such as reactive sweepback would cause malfunctioning of the ring counter 30 and ultimate improper application of signals to the SCR's. Proper operation of the ring counter 30 is maintained by interposing pulse transformers 47, 48 and 49 between the ring counter output leads 37, 38 and 39 and the gates 27, 28 and 29.

Each transformer must provide an output that corresponds to a respective one of the curves 27', 28' and 29'. But the transformers can only operate with alternating currents. The signals from leads 37, 38 and 39 must first be converted to alternating current forms so that the transformers 47, 48 and 49 can operate upon them. Such usable forms are illustrated at 47', 48' and 49' in FIGURE 2.

To produce the required waveforms for the transformers, oscillators 57, 58 and 59 are provided that are excited by the signals at the output leads 37, 38 and 39.

The oscillators and their associated transformers comprise separate units identical to one another. A description of one suffices for all.

The oscillator 57 constitutes a unijunction transistor 61 arranged for relaxation oscillations in conjunction with the transformer primary 62. The unijunction 61 thus has an emitter 63 connected by a lead 64 to one end of the transformer primary 62. The other end of the transformer primary 62 connects to ground 65 via a capacitor 66. The unijunction 61 has its first base 67 grounded, and its second base 68 connected via a ballast resistor 69 to a source of constant potential, indicated at B+ terminal 70. The emitter 63 also connects, via a resistor 71, to the ring counter output lead 37.

As previously mentioned, the signal on the lead 37 shifts periodically from the level of the common connection 43, that is, ten volts to thirteen volts, which is adequate to trigger the unijunction 61. Thus, for example, if the intrinsic stand-off ratio of the unijunction 61 is 0.6, and the voltage at the second grid 68 is 20 volts, then the critical voltage at first base to trigger conduction will be twelve volts.

The capacitor 66 thus has a nominal charge of ten volts corresponding to the low side potential of lead 37. As the voltage at the lead 37 shifts to thirteen volts, the current flows via resistor 71, and in one direction through transformer winding 62 to the condenser 66 until the voltage at the condenser 66 reaches the trigger value of twelve volts. The unijunction is then triggered and the charge collected on the capacitor 66 reverses, passing current in the opposite direction through the transformer winding 62, lead 64, emitter 66, first base 67 to ground. The potential at the capacitor 66 accordingly falls, and the unijunction extinguishes itself. The cycle is again repeated as long as the ring counter output lead 37 is at its relatively elevated potential. The waveform shown at 47' in FIGURE 2 accordingly results.

The frequency of the oscillations of the relaxation oscillator 57 is substantially greater than the frequency at the ring counter output lead 37, as determined by the constants of the circuit.

In order to change the waveform as at 47', 48' and 49' (FIGURE 2) into the form illustrated at 37', 38' and 39' at the secondary sides 77, 78 and 79 of the transformer, the oscillations must be rectified and filtered. Merely smoothing the oscillations will result in a loss of signal; but if the signal at 47, 48 and 49 is rectified, as illustrated at 77', 78' and 79' in FIGURE 2, the smoothing will then result in the waveform at 37', 38' and 39'.

For these purposes, diodes 80 and 81 are provided for transformer secondary 77. The anodes of the diodes 80 and 81 are connected to opposite ends of the secondary 77, and their cathodes are connected together. A capacitor 82 parallels the secondary 77 to aid commutation. The secondary 77 also has a center tap 83.

The diodes 80 and 81 provide the requisite rectification and the curve shown at 77' in FIGURE 2 accurately depicts the voltage waveform envelope from the center tap 83 to the cathode side of diodes 80 and 81. This voltage is applied to the input circuit of SCR 14. A lead 84 extends from diodes 80 and 81 to the gate 27, and a lead 85 extends from the center tap 83 to the SCR cathode as at quadrature terminal 24. A biasing network comprising a resistor 86 and a capacitor 87 in parallel biases the gate 27 so that it is triggered only in response to the relatively substantial signal produced by the transformer, and not by noise.

Circuits for other transformers are similar.

By adjusting the signal across the input leads 40 and 41 of the ring counter, the modulation frequency is changed, say, between 30 and 90 cycles for a 60-cycle supply at terminals 25 and 26.

The wave shape produced by the triggering of the SCR's 14, 15 and 16 is illustrated at 11', 12' and 13' in FIGURE 3. The wave shape may be explained with reference to the curve E (FIGURE 3) which depicts the voltage across the SCR 14 produced when an A.C. source is connected at terminals 25, 26. At 27' is depicted the gate signal for a modulation frequency slightly less than the frequency of the source E. Thus, eight gate signal pulses exist in a period corresponding to eighteen half cycles of the source E. Thus, the ring counter repetition rate is 8/9 of the source frequency, or 53⅓ c.p.s. for a 60 c.p.s. source. The first pulse at 27' is in phase with the source E and turns the SCR on as depicted by the voltage curve V at V–1. The voltage waveform produced by the first pulse follows the source voltage E to zero. During the second half cycle of the source E, which is negative, the gate signal is absent and hence the SCR remains off. During the third half cycle a pulse exists, but the firing is delayed, as depicted at V–2. Again the voltage follows the source voltage to zero. But the width is reduced due to the starting phase shift.

For the third pulse, V-3, the gate current is so shifted in phase that it dwells into the negative half cycle of the source E. Conduction during the positive half is further restricted, but conduction exists throughout the negative half cycle since gate current existed to turn the SCR on. The voltage shape for the succeeding pulses is depicted, the conduction angle being restricted.

At the curve 11', the current resulting is illustrated, the reactance of the windings accounting not only for the change in shape as compared to the voltage curve V, but also for a dwell of current after the voltage falls to zero. The envelope Q for the current wave is indicated in the drawings, there being some overlap of positive and negative halves of the envelope. Current is initiated in one direction near maximum amplitude and then gradually decays.

Due to the fact that current envelope Q has a finite value extending over an angle more than 120 degrees, the maximum field intensity does not abruptly shift, as in a stepper, but shifts more gradually about the axis of the stator.

The envelope shape depicted at 11' does not ideally produce smoothness of operation. An ideal relationship would be achieved by having the rate of change of current in any winding section, and as controlled by the modulation envelope, correspond to a function producing a constant rate of angular rotor movement at constant torque. Adjustment to achieve such relationship may be accomplished by relatively delaying the firing of the SCR's.

While the particular variable frequency power supply for dynamoelectric machines herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In apparatus for producing several outputs of a common source respectively modulated in out-of-phase relationship; a circuit means for producing at a variable rate pulses in sequence at a plurality of outputs; a corresponding plurality of switching devices; a reversible motor having a plurality of coil sections; circuit means for connecting the switching devices to said coil sections; a plurality of transformers; oscillators for driving the transformers; circuit means for operating the oscillators during the existence of pulses from said circuit outputs respectively; separate rectifier means driven by the transformers; means for smoothing pulsations at said rectifier means; and circuit means for controlling said switching devices in accordance with the smoothed rectified output of said transformers to drive said motor selectively in either direction and with positive torque at zero speed.

2. In apparatus of the character described; a reversible motor having a plurality of winding sections; a controlled rectifier for each winding section, and having a gate circuit; means connecting the winding sections to a single phase source of alternating current in dependence upon the corresponding controlled rectifiers; a transformer for each controlled rectifier, and having a rectified smoothed output driving the corresponding gate circuit; first circuit means for producing, at a variable rate, pulses in sequence at a plurality of outputs corresponding to the number of winding sections and rectifiers; and second circuit means for exciting the transformers in accordance with the existence of pulses at the output of said first circuit means thereby to modulate said single phase at frequencies selectively above and below the frequency of said single phase source to control the direction of rotation of said motor.

3. The invention of claim 1, wherein said load is a motor receiving energization of positive potential applied to one terminal of said load.

4. In the apparatus according to claim 2, for providing a reversible synchronous variable speed motor system in which each of the winding sections is capable of separate excitation; and gating means for each gate circuit for sequencing the excitation of the winding sections by a portion of either half-cycle of said alternating current source at a variable rate over a frequency range of $(nf-\frac{1}{2}f)$ to $(nf+\frac{1}{2}f)$ where $n$ is a whole number greater than zero and $f$ is the frequency of the alternating current source.

5. In the apparatus according to claim 2 for providing a synchronous variable speed motor system in which each of the winding sections is capable of separate excitation; said first circuit means producing a plurality of substantially square wave signals in multiple phase relationship for triggering the controlled rectifiers in sequence to energize the winding sections by at least a portion of either half-cycle of said alternating current source; and said second circuit means includes means for varying the frequency of said square wave signals over a range of $(nf-\frac{1}{2}f)$ to $(nf+\frac{1}{2}f)$ where $n$ is a whole number greater than zero and $f$ is the frequency of the alternating current source.

6. In the apparatus according to claim 2 for providing a synchronous variable speed motor system in which each of the winding sections is capable of separate excitation; and means for modulating the excitation of the winding sections by a portion of either half-cycle of said alternating current source in multiple phase relationship and at a variable rate, the modulation envelope causing rate of change of current in any winding section to produce a substantially constant rate of angular rotor movement at constant torque.

7. In a reversible synchronous variable speed motor system: a plurality of spaced winding sections for a dynamoelectric machine capable of separate excitation; means forming a pair of terminals across which a single phase substantially fixed frequency alternating current source is connected; an excitation circuit for each of said winding sections and connected in series therewith across said terminal forming means; and gating means operatively associated with the excitation circuits for sequencing the excitation of the winding sections by a portion of either half-cycle of said fixed frequency source at a variable rate over a frequency range of $(nf-\frac{1}{2}f)$ to $(nf+\frac{1}{2}f)$ where $n$ is a whole number greater than zero and $f$ is the frequency of the alternating current source to drive said synchronous motor selectively in either direction at any of many different speeds.

8. In a synchronous variable speed motor system: a series of spaced winding sections for a dynamoelectric machine capable of separate excitation; means forming a pair of terminals across which a single phase substantially fixed frequency alternating current source is connected; an anode and cathode of a controlled rectifier forming an excitation circuit for each of said winding sections and connected in series therewith across said terminal forming means; means producing a plurality of substantially square wave signals in multiple phase relationship for triggering the controlled rectifiers in sequence to energize the winding sections by at least a portion of either half-cycle of said fixed frequency alternating current source; and means for varying the frequency of said square wave signals over a range of $(nf-\frac{1}{2}f)$ to $(nf+\frac{1}{2}f)$ where $n$ is a whole number greater than zero and $f$ is the frequency of the alternating current source to drive said synchronous motor selectively in either direction at any of many different speeds.

9. In a synchronous variable speed motor system: a plurality of spaced winding sections for a dynamoelectric machine capable of separate excitation; means forming a pair of terminals across which a single phase substantially fixed frequency alternating current source is connected; an excitation circuit for each of said winding sections and connected in series therewith across said terminal forming means; means for modulating the excitation of the winding sections by a portion of either half-cycle of said fixed frequency source in multiple phase relationship and at a variable rate, the modulation envelope causing rate of change of current in any winding section to produce a substantially constant rate of angular rotor movement at constant torque and with a positive torque at zero speed.

10. In a variable-speed reversible dynamoelectric system: dynamoelectric means providing first and second structures the first of which is movable relative to the other and one of said structures including a plurality of spaced-apart electromagnetic means including respective winding sections arranged for separate excitation from a separate power source; a second source of electric power; variable-frequency electronic means for supplying power from said source to said winding sections in sequence at the frequency of said electronic means to modulate the power from said first power source thereby to create an advancing electromagnetic field in either of two opposite directions; and said first structure having magnetic means in said field and coerced thereby to move in the direction of advance of said field.

11. A system according to claim 10 wherein said first source of power is a source of direct current power.

12. A system according to claim 10 wherein said first source of power is a source of alternating current power.

13. A system according to claim 12 wherein the frequency of said variable-frequency electronic means is variable from a frequency lower than that of said source of alternating current power to a frequency higher than that of said source of alternating current power.

14. In a variable-speed motor system, a reversible synchronous electric motor having a plurality of stator winding sections adapted to be connected across a source of electrical energy and including separate silicon control rectifier switch means operable to control the energization of each winding section independently of the others, and variable frequency electronic means for opening and closing said silicon control rectifier means in sequence at any desired variable frequency to modulate the power supplied from said source of electrical energy to create an electromagnetic field which advances progressively around said stator by way of each of said winding sections and is effective to drive said motor in either direction and with a positive torque at zero speed.

15. A variable-speed motor system as defined in claim 14 characterized in the provision of buffer means connected between said silicon controlled rectifier switch means and said variable frequency electronic means and effective to isolate electronic means from currents flowing in said switch means and in said winding sections.

16. A variable-speed motor system as defined in claim 15 characterized in that said buffer means includes a separate transformer for each of said winding sections and including means for connecting each primary to receive the variable frequency signal from said electronic means and other means for connecting each transformer secondary in circuit with said silicon controlled rectifier switch means.

17. A variable-speed motor control system as defined in claim 14 characterized in that said variable frequency electronic means includes a separate ring counter for each of said winding sections arranged to be energized repeatedly in sequence at any selected frequency.

References Cited by the Examiner
UNITED STATES PATENTS

| | | | |
|---|---|---|---|
| 2,980,839 | 4/1961 | Haeusserman | 318—138 |
| 3,089,992 | 5/1963 | Seney | 318—138 |
| 3,109,131 | 10/1963 | Byrd | 319—138 |
| 3,129,368 | 4/1964 | Burnett | 318—138 X |

ORIS L. RADER, *Primary Examiner.*

S. GORDON, G. SIMMONS, *Assistant Examiners.*